No. 777,104. PATENTED DEC. 13, 1904.
F. KAHN.
APPARATUS FOR COOKING BY RETAINED HEAT.
APPLICATION FILED JULY 22, 1904.
NO MODEL. 2 SHEETS—SHEET 1.

HEAT

Witnesses
J. E. Pearson
Frank O'Connor

Felix Kahn
Inventor,
By Geo. H. Benjamin
Attorney

No. 777,104. PATENTED DEC. 13, 1904.
F. KAHN.
APPARATUS FOR COOKING BY RETAINED HEAT.
APPLICATION FILED JULY 22, 1904.
NO MODEL. 2 SHEETS—SHEET 2.
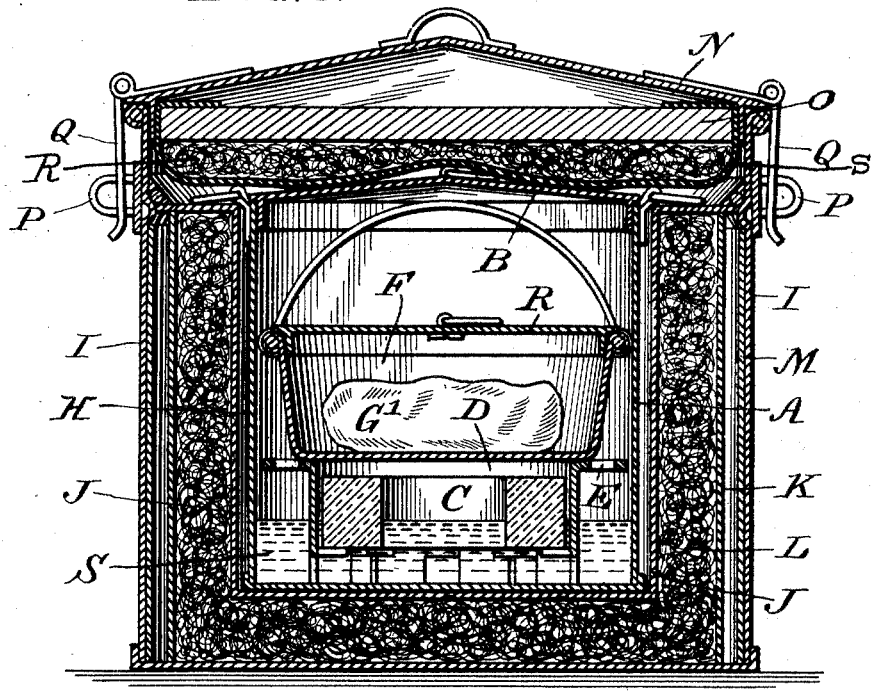
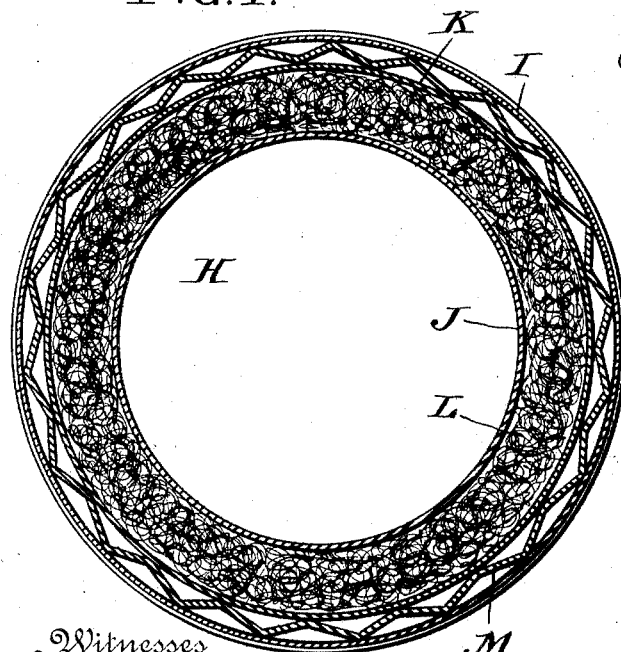
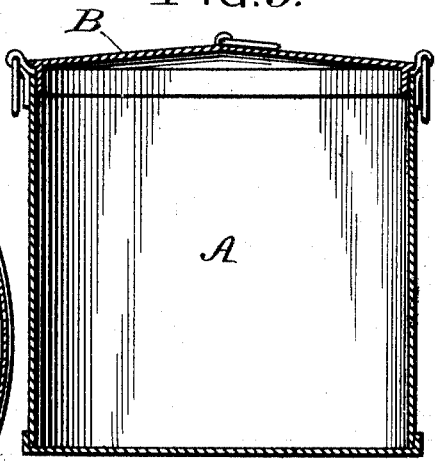

No. 777,104.  Patented December 13, 1904.

UNITED STATES PATENT OFFICE.

FELIX KAHN, OF NEW YORK, N. Y., ASSIGNOR TO JAMES S. MacCOY, OF NEW YORK, N. Y.

APPARATUS FOR COOKING BY RETAINED HEAT.

SPECIFICATION forming part of Letters Patent No. 777,104, dated December 13, 1904.

Application filed July 22, 1904. Serial No. 217,630. (No model.)

*To all whom it may concern:*

Be it known that I, FELIX KAHN, a citizen of the United States, residing at New York city, county and State of New York, have invented an Apparatus for Cooking by Retained Heat, of which the following is a specification.

This invention is based upon the observed fact that if a body of food to be cooked, whether fluid or solid, is subjected to the action of sensible heat, together with a heat-absorbing body of sufficient capacity and for a sufficient length of time to permit said bodies to be thoroughly heated and are then removed from the influence of such sensible heat and placed in a closed receptacle having such construction as to radiate heat from within very slowly that such article of food will within a definite period of time, depending upon the character of the article of food, become thoroughly cooked.

The objects of the invention are to materially reduce the amount of sensible heat required to effect cooking, to reduce the time that the article of food is subjected to the action of sensible heat, to reduce largely the care or attention necessarily given in cooking, to reduce the wear and tear on the vessels in which cooking is accomplished, and, finally, to effect perfect cooking without the loss of the juices and other volatile matters usually evolved in cooking operations.

To carry my invention into effect, I make use of the apparatus which I will now describe.

Figure 1:
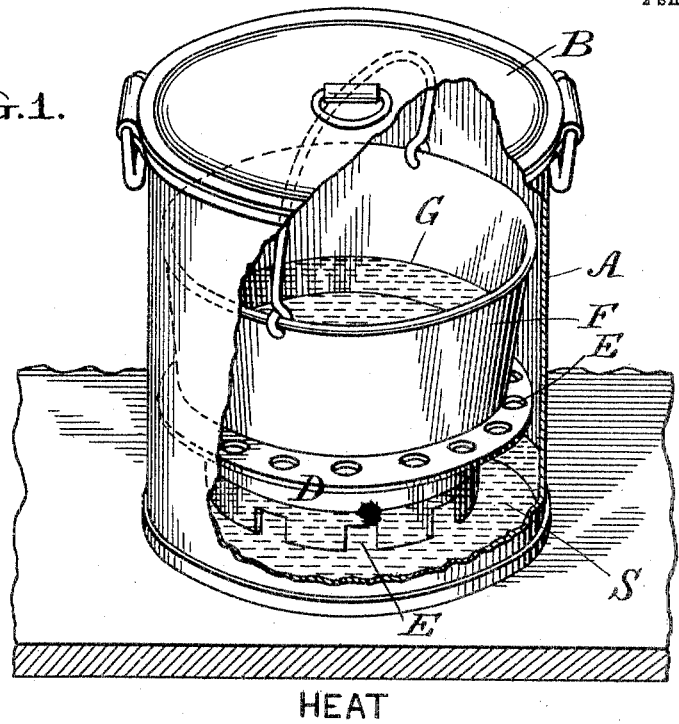
Figure 2:
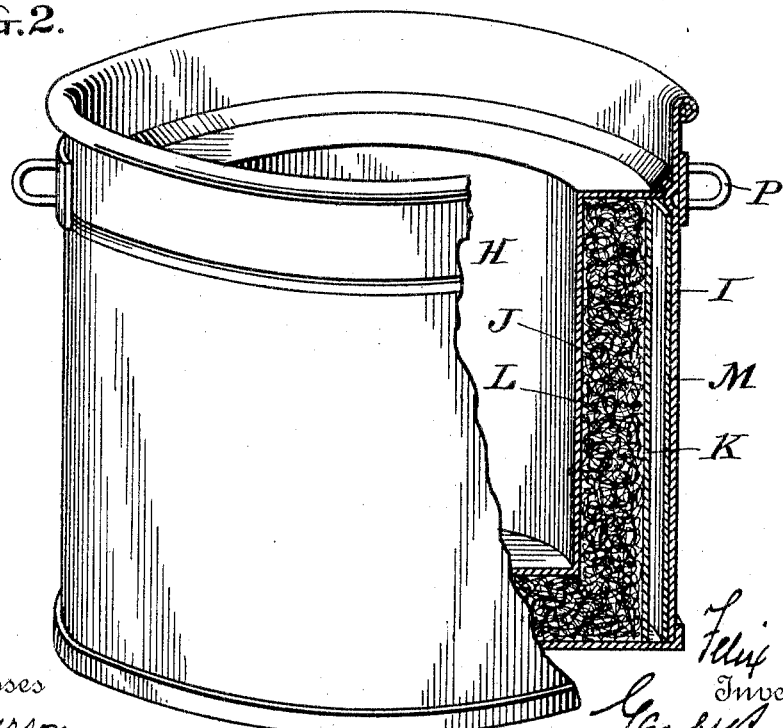

Figure 1 is a view in perspective, showing the heating vessel with a portion broken away, also the vessel for containing the food to be cooked, the support for such vessel, and a contained body of heat-retaining substance, all shown as located upon the top plate of a stove or other device heated in any manner. Fig. 2 is a view in perspective, with a portion broken away, of the heat-retaining vessel. Fig. 3 is a vertical section showing the vessels illustrated in Figs. 1 and 2 assembled. Fig. 4 is a horizontal section through the heat-retaining vessel. Fig. 5 is a vertical section through the heating vessel.

In the drawings, A represents the heating vessel, which may be formed of any suitable material and provided with a cover B. Located within this vessel is a body of heat-absorbing material, which in the present case is shown as a porous brick C. Such heat-absorbing body may, however, be formed of any substance which will absorb heat, fluid, granular, or solid.

I do not limit myself in any wise to the character of the heat-absorbing body, provided it shall have the required heat-absorbing capacity. The heat-absorbing capacity of such body will depend upon the substance of which it is made. The heat-absorbing capacity can readily be determined by experiment.

Surrounding the heat-absorbing body C is an annular rest D, which is shown as provided with perforations E and serves as a support for the heat-absorbing body C and for the cooking vessel F. The character, shape, and general configuration of this support and the manner in which the heat-absorbing body and cooking vessel F are supported is entirely immaterial. The cooking vessel F may have any desired shape—for instance, that of an ordinary cooking vessel—and located within the cooking vessel is indicated a fluid body G to be cooked. In Fig. 3 there is indicated, as within the cooking vessel F, a solid body G' to be cooked.

H represents the heat-retaining vessel, which consists of an outer shell I, an inner shell J, an intermediate shell K, a body of non-conducting material L, preferably formed of hair, comminuted cork, or other non-conducting substance, situated between the partitions J K and a corrugated vertically-disposed partition M, preferably formed of paper, situated between the shells K I.

Situated on the top of the heat-retaining vessel is a cover N. This cover is rendered non-conductive to avoid loss of heat by means of a circular board O, bearing on its lower side a pad R, formed of fibrous packing retained by a flexible lining S of fabric or other material, which is carried up over the edges of the circular board O. At the sides of the heat-retaining vessel are bails P, over which are passed hasps Q, pivoted to the cover.

I do not limit myself in any wise to the described construction of the heat-retaining vessel, as any shape or construction of vessel will serve the purpose, provided it is adapted to receive the heating vessel and to permit but very slow radiation of the heat of the bodies within the heated vessel.

The method of using the described vessels for carrying my invention into effect is as follows: A body of water, indicated at S, Figs. 1 and 3, is first placed in the bottom of the heating vessel A. The body of heat-absorbing material C and the rest D are then inserted, after which the cooking vessel F, containing the food to be cooked, is inserted within the heating vessel A and the cover B applied. The heating vessel A, with the contained articles as described, is then placed on the top of a stove or any other location where it will be subjected to the action of sensible heat and left in such location for a sufficient period of time, which will depend entirely upon the character of the article to be cooked, ranging anywhere from five to thirty minutes or until the heat-absorbing material and the food to be cooked have become thoroughly heated. The heating vessel is then removed from proximity to the source of sensible heat and inserted into the heat-retaining vessel H and the cover N secured in place. If the cooking is to be what is known as "dry" cooking, the cover R of the cooking vessel F is put on. If, on the other hand, the cooking is to be what is known as "moist" cooking, the cover R is left off of the cooking vessel. It will be understood that if the cover R is left on the cooking vessel none of the moisture due to the evaporation of the water S can find access to the material within the cooking vessel, whereas if the cover R is removed the contrary is the case. The assembled vessels, as shown in Fig. 3, are then set aside and left for a period of time from fifteen minutes to twelve hours, depending upon the character or bulk of the food to be cooked within the cooking vessel, after which time the cooking will be found to have been accomplished.

In dry cooking the body of water (indicated at S) may be omitted. I, however, prefer to use such body of water, as the water in itself is a heat-absorbing body and supplements the heat-absorbing body C.

It will be observed that the heating vessel A will remain but a short time upon the stove or in any other position where its contents are subjected to sensible heat. Consequently the capacity of such stove is largely increased, and the destructive action of the heat upon such vessels is minimized. Further, owing to the heat-retaining quality of the vessel H the cooking is readily accomplished and the cooked food maintained in the best possible condition until such time as it is desired to serve it. It will likewise be noticed that as all cooking is effected within the closed heat-retaining vessel there can be no escape of the volatile portions of the food, the result being that the flavor of the foods is retained and the usual losses in weight in a large measure prevented.

Having thus described my invention, I claim—

1. An apparatus for cooking by retained heat, comprising a heat-retainer, a detachable heating vessel, a cooking vessel therein, a rest for said cooking vessel, and a body of heat-absorbing material in said heating vessel.

2. In an apparatus for cooking by retained heat, the combination of a heat-retainer, a removable heating vessel, a removable cooking vessel, a rest for said cooking vessel, and a body of heat-absorbing material situated in the bottom of said heating vessel.

3. In an apparatus for cooking by retained heat, the combination of a heat-retainer, a removable heating vessel, a removable cooking vessel, a rest for said cooking vessel, and a body of heat-absorbing material situated in the bottom of said heating vessel and under said cooking vessel.

4. An apparatus for cooking by retained heat, comprising a heat-retainer, a removable heating vessel, a removable cooking vessel therein, means for supporting said cooking vessel above the bottom of the heating vessel, and a body of heat-absorbing material in the bottom of said heating vessel.

5. An apparatus for cooking by retained heat, comprising a heat-retainer, a removable heating vessel, a cooking vessel therein, a rest for said cooking vessel, and a suspended body of heat-absorbing material in said heating vessel.

6. An apparatus for cooking by retained heat, comprising a heat-retainer, a removable heating vessel, a cooking vessel, a cover therefor, a rest for the cooking vessel, and a body of heat-absorbing material.

7. An apparatus for cooking by retained heat, comprising a heat-retainer, a heating vessel, a cover therefor, a cooking vessel, a cover therefor, a rest, and a body of heat-absorbing material.

In testimony whereof I affix my signature in the presence of two witnesses.

FELIX KAHN.

Witnesses:
J. E. PEARSON,
FRANK O'CONNOR.